(12) United States Patent
Sugimoto

(10) Patent No.: US 10,168,468 B2
(45) Date of Patent: Jan. 1, 2019

(54) ILLUMINATION DEVICE AND DISPLAY DEVICE

(71) Applicant: Sakai Display Products Corporation, Sakai-shi, Osaka (JP)

(72) Inventor: Arimasa Sugimoto, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 108 days.

(21) Appl. No.: 15/023,975

(22) PCT Filed: Sep. 24, 2014

(86) PCT No.: PCT/JP2014/075270
§ 371 (c)(1),
(2) Date: Mar. 22, 2016

(87) PCT Pub. No.: WO2015/046240
PCT Pub. Date: Apr. 2, 2015

(65) Prior Publication Data
US 2016/0245988 A1    Aug. 25, 2016

(30) Foreign Application Priority Data

Sep. 26, 2013  (JP) ................................ 2013-200471

(51) Int. Cl.
*F21V 8/00* (2006.01)
(52) U.S. Cl.
CPC ........... *G02B 6/0088* (2013.01); *G02B 6/002* (2013.01); *G02B 6/0055* (2013.01)
(58) Field of Classification Search
CPC ..... G02B 6/0088; G02B 6/002; G02B 6/0055

USPC ................................................. 362/621, 633
See application file for complete search history.

(56) References Cited

U.S. PATENT DOCUMENTS

| 8,502,933 | B2* | 8/2013 | Park | G02B 6/0073 349/58 |
|---|---|---|---|---|
| 9,488,770 | B2* | 11/2016 | Horiguchi | G02F 1/133308 |
| 2011/0286241 | A1* | 11/2011 | Pan | G02B 6/0085 362/607 |

(Continued)

FOREIGN PATENT DOCUMENTS

| JP | 2012-028077 A | 2/2012 |
|---|---|---|
| JP | 2013-143220 A | 7/2013 |
| WO | WO2012002074 A1 | 1/2012 |

*Primary Examiner* — Evan Dzierzynski
*Assistant Examiner* — Naomi M Wolford
(74) *Attorney, Agent, or Firm* — Rudy J. Ng; Bret E. Field; Bozicevic, Field & Francis LLP

(57) ABSTRACT

Provided are an illumination device and a display device capable of even illumination. A positioning recess provided in a light guide plate and a peripheral portion of the recess are covered by a cover from one surface side of the light guide plate. As a result, the cover suppresses the emission of light emitted from the vicinity of the recess on the one surface of the light guide plate onto the outside of a backlight unit that functions as an illumination device. Thus, even if light is scattered at the recess of the light guide plate and the brightness of the vicinity of the recess is greater than the brightness of other portions, the leaking of excessively bright light onto the outside of the backlight unit (in this case, onto the display panel side) is suppressed. That is, brightness unevenness caused by the recess of the light guide plate is suppressed.

11 Claims, 10 Drawing Sheets

(56) References Cited

U.S. PATENT DOCUMENTS

2013/0120669 A1* 5/2013 Kuromizu ............ G02B 6/0033
348/790

* cited by examiner

ILLUMINATION DEVICE AND DISPLAY DEVICE

CROSS-REFERENCE TO RELATED APPLICATIONS

This application is the national phase under 35 U. S. C. § 371 of PCT International Application No. PCT/JP2014/075270 which has an International filing date of Sep. 24, 2014 and designated the United States of America.

FIELD

The present invention relates to an illumination device and a display device including a light guide plate positioned by engagement of recesses and protrusions.

BACKGROUND

A liquid crystal display device is configured to include a liquid crystal display panel which displays images and a backlight unit which illuminates the liquid crystal display panel from a back surface side of the liquid crystal display panel.

Hereinafter, a case where the liquid crystal display panel is arranged in the vertical orientation will be described.

In the related art, an edge-light type backlight unit is disclosed (refer to International Publication Pamphlet No. 2012/002074). In the edge-light type backlight unit, a rectangular light guide plate is arranged through an optical sheet group at the back surface side of the liquid crystal display panel, a light-reflecting sheet is arranged at the back surface side of the light guide plate, and a light source unit is arranged to face the lower end surface of the light guide plate.

Light emitted from the light source unit passes through the lower end surface of the light guide plate to enter to an inside of the light guide plate. The light entering to the inside of the light guide plate is emitted from the front surface of the light guide plate. The light emitted from the front surface of the light guide plate is diffused and condensed by the optical sheet group to enter to an inside of the liquid crystal display panel.

When the backlight unit evenly illuminates the liquid crystal display panel, a display area of the liquid crystal display panel becomes evenly bright.

The light guide plate is supported between a frame-shaped panel chassis (hereinafter, referred to as a P chassis) arranged at the front surface side of the light guide plate and a dish-shaped backlight chassis (hereinafter, referred to as a BL chassis) arranged at the back surface side of the light guide plate.

Notch-shaped recesses are provided to the peripheral portion of the light guide plate. Protrusions are provided to the BL chassis. By engagement of the recesses of the light guide plate with the protrusions of the BL chassis, the light guide plate is positioned.

With respect to the protrusions engaged with the recesses of the light guide plate, since the protrusions block light, there is a problem in that brightness of the vicinity of the protrusions is decreased.

In the backlight unit disclosed in International Publication Pamphlet No. 2012/002074, the protrusions are covered by erecting a part of the light-reflecting sheet, so that the light shielding caused by the protrusions is suppressed.

SUMMARY

The recess of the light guide plate unnecessarily scatters the light. For this reason, in some cases, the brightness at the vicinity of the recess of the light guide plate is unnecessarily increased, so that the illumination by the backlight unit becomes uneven (so-called brightness unevenness occurs). Therefore, the vicinity of the recess of the light guide plate in the display area of the display panel becomes partially bright, so that there is a problem in that display quality is deteriorated.

In order to solve this problem, it is considered that the recess of the light guide plate is provided to be far away from the display area of the display panel. In this case, since entering of the light scattered by the recess of the light guide plate to the display area of the display panel is suppressed, the problem that the display area of the display panel becomes partially bright is solved. However, in this case, since the size of the frame area of the display panel needs to be large, a display device having a small-sized frame cannot be implemented.

In view of these circumstances, the present invention is to provide an illumination device and a display device capable of even illumination.

According to one embodiment of the present invention, there is provided an illumination device comprising: a light guide plate having a notch-shaped recess in a peripheral portion and emitting entering light from one surface; and a light guide plate support unit being provided with a protrusion to be engaged with the recess to position the light guide plate and supporting the light guide plate, wherein the illumination device includes a cover covering the recess and a peripheral portion of the recess from a side of the one surface.

In the illumination device according to the embodiment of the present invention, it is preferred that the cover has a light-shielding property.

In the illumination device according to the embodiment of the present invention, it is preferred that the cover has a light-reflecting property.

In the illumination device according to the embodiment of the present invention, it is preferred that a light-reflecting portion is arranged in the cover.

In the illumination device according to the embodiment of the present invention, it is preferred that a light-shielding portion is arranged in the cover.

According to another embodiment of the present invention, there is provided a display device comprising: the above-described illumination device; and a display panel including a display area and a frame area surrounding the display area, the display area being illuminated from a back surface side by the illumination device, wherein at least a part of the cover included in the illumination device is arranged at a back surface side of the display area.

In the display device according to the embodiment of the present invention, it is preferred that the display device further comprises a panel support unit supporting the display panel, wherein the cover is provided integrally with the panel support unit.

In the display device according to the embodiment of the present invention, it is preferred that the cover is arranged over a range from a back surface side of the frame area to a back surface side of the display area, and a portion of the cover arranged at the back surface side of the display area is configured in a tongue shape where a thickness at a plane-directional center side of the light guide plate is smaller than that at a peripheral edge side of the light guide plate or be configured in a tongue shape where a length in a peripheral edge direction of the light guide plate included in the illumination device at the plane-directional center side of the light guide plate is smaller than that at the peripheral edge side of the light guide plate.

In the embodiment of the present invention, a positioning recess provided in a light guide plate and a peripheral portion of the recess are covered by a cover from one surface side of the light guide plate. As a result, the cover suppresses the emission of light emitted from the vicinity of the recess on the one surface of the light guide plate onto the outside of an illumination device. Thus, even if light is scattered at the recess of the light guide plate and the brightness at the vicinity of the recess is greater than the brightness at other portions, the leaking of excessively bright light onto the outside of the illumination device is suppressed. That is, brightness unevenness caused by the recess of the light guide plate is suppressed.

In the preferred embodiment of the present invention, the cover has a light-shielding property or has a total-reflection type or partial-reflection type light-reflecting property. Hereinafter, as the cover having a light-shielding property, a black cover is exemplified, and as the cover having a total-reflection type (or partial-reflection type) light-reflecting property, a white (or gray) cover is exemplified.

The black cover having the light-shielding property efficiently blocks the light emitted from the vicinity of the recess on one surface of the light guide plate. For this reason, the brightness unevenness caused by the recess of the light guide plate can be efficiently suppressed.

The white cover having the total-reflection type light-reflecting property reflects the light emitted from the vicinity of the recess on one surface of the light guide plate at the back surface side of the cover toward the light guide plate side. For this reason, the brightness unevenness caused by the recess of the light guide plate can be efficiently suppressed. In addition, the white cover reflects the light at the front surface side of the cover toward the outside of the illumination device. For this reason, it is possible to suppress the brightness unevenness caused by the recess of the light guide plate, and it is possible to suppress the problem in that, due to the existence of the cover, the brightness at the vicinity of the recess of the light guide plate is decreased, and thus, the brightness unevenness occurs. In other words, the white cover can suppress the brightness unevenness caused by the cover itself.

The gray cover having the partial-reflection type light-reflecting property has intermediate function and effect between the black cover and the white cover. Therefore, for example, when gray colors are appropriately selected according to balance among components of the illumination device, the suppression of the brightness unevenness caused by the recess of the light guide plate and the suppression of the brightness unevenness caused by the cover itself can be easily simultaneously achieved.

In the preferred embodiment of the present invention, the black cover where a total-reflection type or partial-reflection type light-reflecting portion is arranged has the same functions and effects as those of the white or gray cover. The gray cover where a total-reflection type light-reflecting portion is arranged has the same functions and effects as those of the white cover. In a case where a partial-reflection type light-reflecting portion having a low (or high) light-reflecting property is arranged in a gray cover having a high (or low) light-reflecting property, the gray cover where the partial-reflection type light-reflecting portion is arranged has the same functions and effects as those of other gray covers of which the degree of partial reflection is different from that of the cover itself.

The employment of the light-reflecting portion is very appropriate to a case where the cover is provided integrally with, for example, a panel support unit of the display device. This is because the cover provided integrally with the panel support unit can be easily configured to have a necessary light-reflecting property irrespective of a degree of the light-shielding property or light-reflecting property of the panel support unit (furthermore, the cover itself).

In the preferred embodiment of the present invention, the white or gray cover where a light-shielding portion is arranged has the same functions and effects as those of the black cover.

The employment of the light-shielding portion is very appropriate to a case where the cover is provided integrally with, for example, a panel support unit of the display device. This is because the cover provided integrally with the panel support unit can be easily configured to have a light-shielding property irrespective of a degree of the light-reflecting property of the panel support unit (furthermore, the cover itself).

In the preferred embodiment of the present invention, at least a part of the cover is arranged between the display area of the display panel and the light guide plate. For this reason, direct entering of the light emitted from a range of the light guide plate covered by the cover on the display area of the display panel is suppressed.

However, the portion where the cover is arranged is a portion which becomes unnecessarily bright by the light scattered by the recess of the light guide plate. Therefore, light entering to the display area of the display panel is restricted by the cover, so that the display area of the display panel becomes evenly bright.

In the preferred embodiment of the present invention, the cover is provided integrally with a panel support unit which exists in the related art. For this reason, the illumination device or the display device needs not to be provided with a support unit supporting the cover. In addition, in a case where the cover is provided integrally with the panel support unit, there is no problem in that the number of components is unnecessarily increased due to the existence of the cover.

In the preferred embodiment of the present invention, the cover is formed in a tapered tongue shape which is thinned from the frame area side of the display panel toward the display area side. For this reason, the cover is not more easily noticeable than a case where the cover is formed in a non-tapered (for example, club-shaped) tongue shape. This is because the change in the brightness at the vicinity of the cover becomes smooth.

In the case of an illumination device and a display device according to one embodiment of the present invention, a recess of the light guide plate and a peripheral portion of the recess are covered by a cover. Therefore, brightness unevenness caused by the recess of the light guide plate can be suppressed. As a result, even illumination by the illumination device can be obtained.

The display device including such an illumination device can allow the brightness of the display area of the display panel to become even. Therefore, the display quality of the display panel can be improved. In addition, although the recess of the light guide plate is arranged to be close to the display area of the display panel, there is no particular problem, and thus, a small-sized frame can be implemented.

The above and further objects and features will more fully be apparent from the following detailed description with accompanying drawings.

DETAILED DESCRIPTION

Hereinafter, embodiments of the present invention will be described in detail with reference to the drawings. In the description hereinafter, up-down, front-back, and left-right are used as illustrated in the arrows in the figure.

First Embodiment

Figure 1:
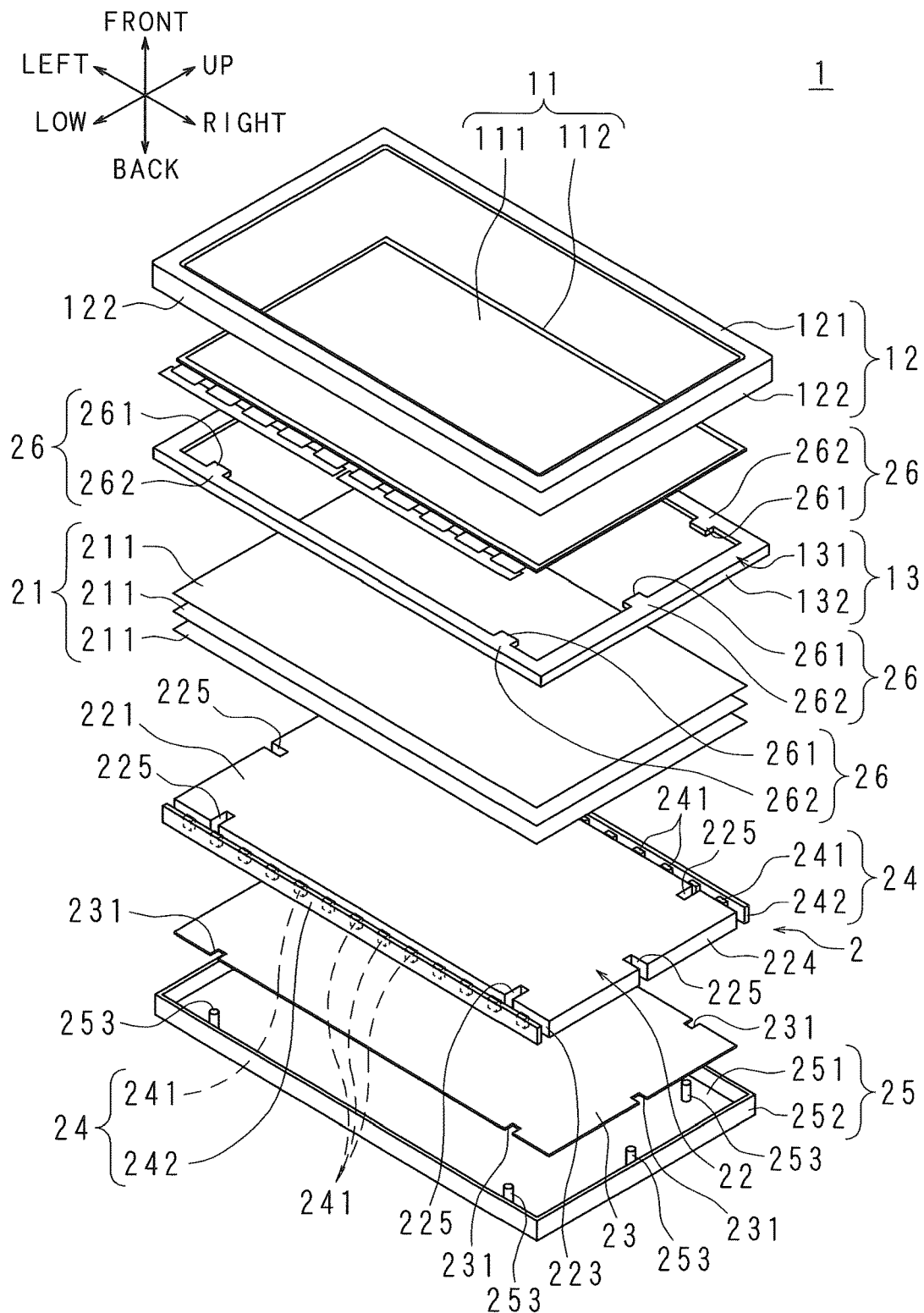
FIG. 1 is an exploded perspective diagram illustrating a configuration of a display device according to a first embodiment of the present invention.

FIG. 1 is an exploded perspective diagram illustrating a configuration of a display device 1 according to a first embodiment of the present invention.

Figure 2:
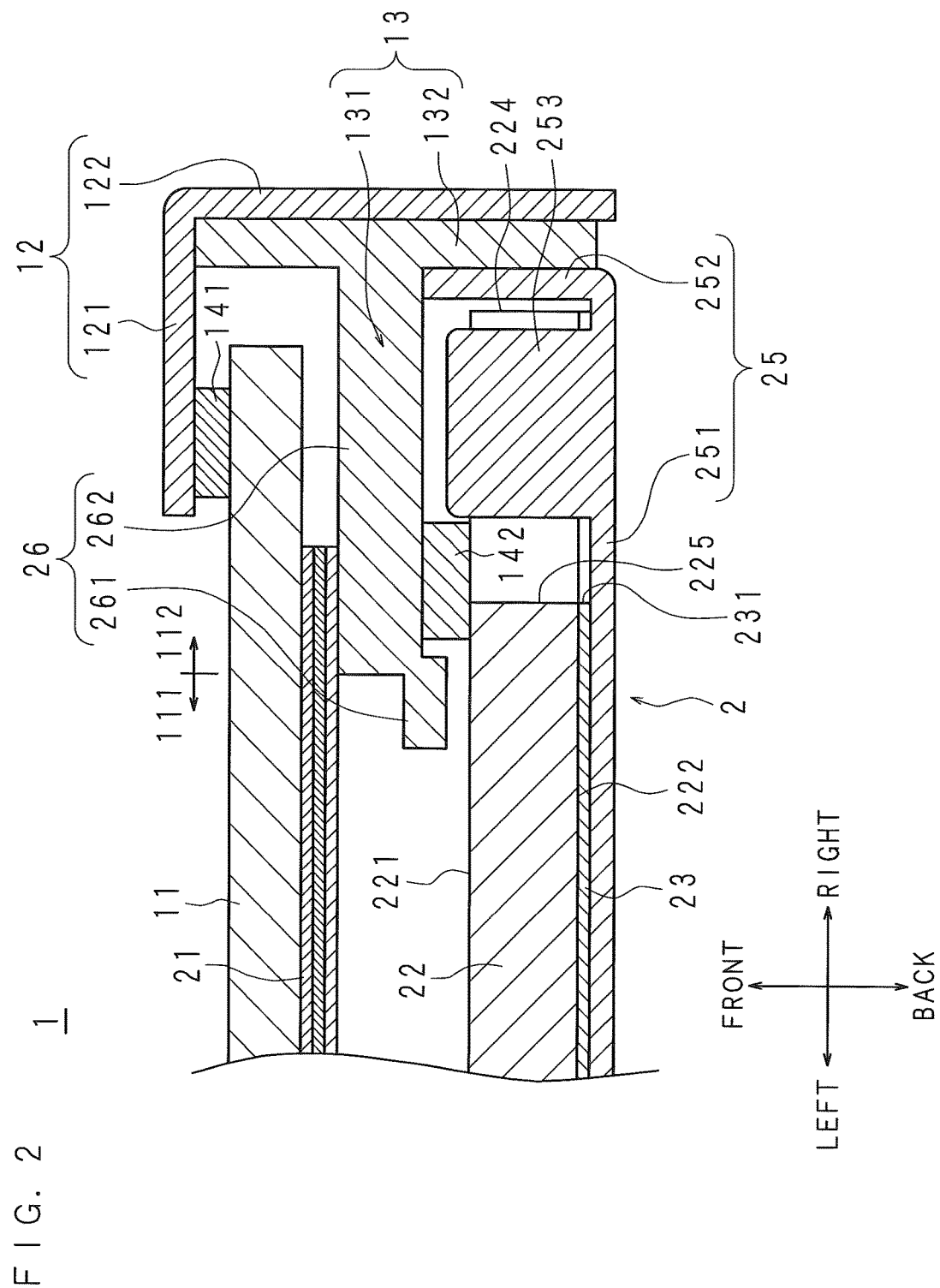
FIG. 2 is a horizontal cross-sectional diagram schematically illustrating a configuration of the vicinity of a cover included in the display device.
Figure 3:
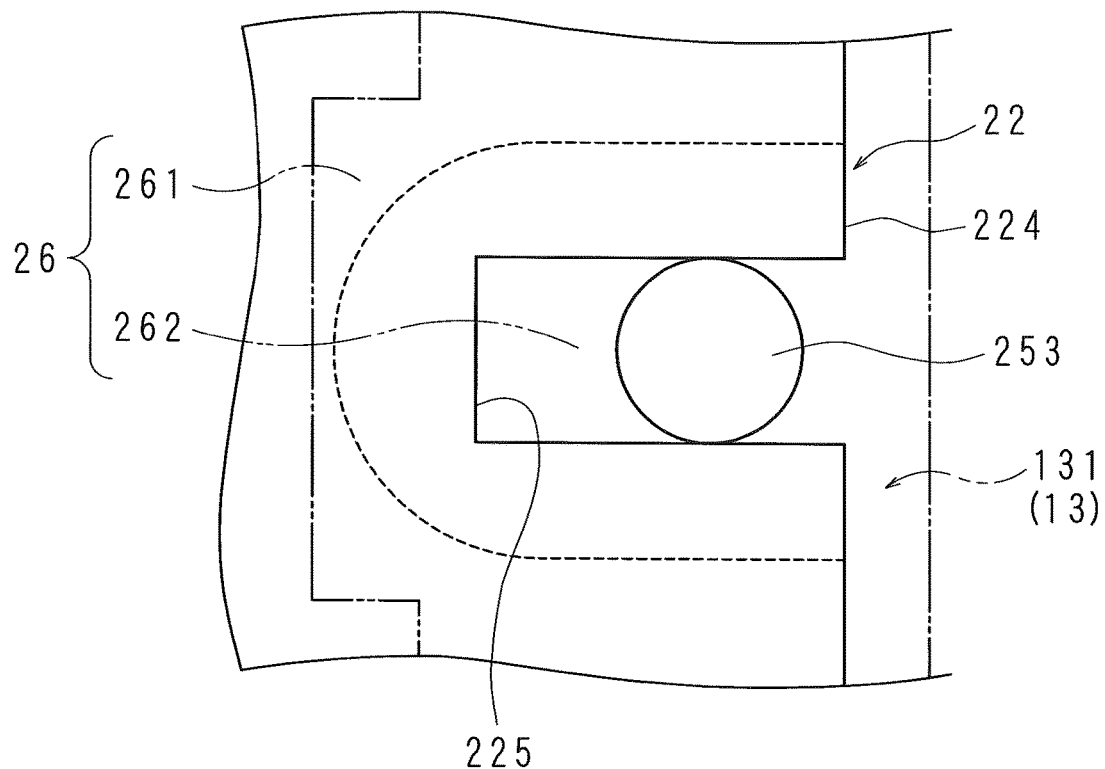
FIG. 3 is a front diagram schematically illustrating the configuration of the vicinity of the cover.
Figure 3:
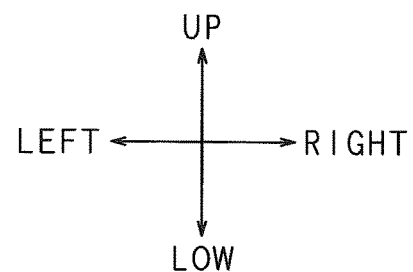

FIGS. 2 and 3 are horizontal cross-sectional diagram and front diagram schematically illustrating a configuration of the vicinity of a cover 26 included in the display device 1.

The display device 1 according to the embodiment is configured, for example, a television set, an electronic signboard, a monitor for a personal computer, or the like.

First, the configuration of the display device 1 will be described.

The display device 1 is configured to include a display panel 11, a bezel 12, a P chassis (panel support unit) 13, a backlight unit (illumination device) 2, a cabinet (not shown) housing these components in a state that a later-described display area 111 is exposed, and the like.

The display panel 11 is configured by using a liquid crystal display panel. The display panel 11 is formed in a rectangular shape and is arranged in the vertical orientation.

The display panel 11 is configured to include a rectangular display area 111 and a rectangular frame-shaped frame area 112 surrounding the display area 111. The display panel 11 is configured by using a glass substrate at the front surface side and a glass substrate at the back surface side. Liquid crystal is sealed between the two glass substrates. Transmittance of the display panel 11 varies with a voltage applied to the liquid crystal of the display panel 11.

The bezel 12 is a rectangular frame structure for supporting the display panel 11 from the front surface side. The bezel 12 is configured to include a plate-shaped front frame portion 121 and four plate-shaped side frame portions 122, 122, . . . protruding backward from the outer peripheral edge portion of the front frame portion 121.

The P chassis 13 is a rectangular frame structure for supporting the display panel 11 from the back surface side. The P chassis 13 is arranged to be closer to the back surface than the front frame portion 121 of the bezel 12 and to be inner than the side frame portions 122, 122, . . . . The P chassis 13 is configured to include a plate-shaped front frame portion 131 and four plate-shaped side frame portions 132, 132, . . . protruding backward from the outer peripheral edge portion of the front frame portion 131.

Furthermore, the front frame portion 131 is configured to include rectangular tongue-shaped covering protrusions 261, 261, . . . protruding inward from the inner peripheral edge portion of the front frame portion 131. The thickness (front-back directional distance) of the covering protrusion 261 is constant. The covering protrusion 261 and the vicinity of the base end portion (hereinafter, referred to as a covering base end portion 262) of the covering protrusion 261 of the front frame portion 131 function as a cover 26 according to the embodiment. Two covers 26 are provided to each of the upper and lower horizontal frame portions of the front frame portion 131, and one cover 26 is provided to each of the left and right vertical frame portions. The number and up-down and left-right directional installation positions of the covers 26, 26, . . . correspond to the number and up-down and left-right directional installation positions of a later-described recesses 225, 225, . . . .

The display panel 11 and a later-described optical sheet group 21 are interposed through an elastic member 141 between the front frame portion 121 of the bezel 12 and the front frame portion 131 of the P chassis 13.

The backlight unit 2 is configured to include an optical sheet group 21, a light guide plate 22, a light-reflecting sheet 23, light source units 24 and 24, and a BL chassis (light guide plate support unit) 25.

The BL chassis 25 is formed in a dish shape. The BL chassis 25 is configured to include a back surface portion 251 corresponding to the bottom surface of the dish and a peripheral surface portion 252 corresponding to the peripheral surface of the dish. A plurality of protrusions 253, 253, . . . are installed to protrude from the front surface side of the back surface portion 251. Each of the protrusions 253 is formed in a horizontally-oriented cylindrical shape arranged in the front-back direction.

In addition, the protrusion 253 is not limited to the cylindrical shape, but for example, the protrusion may be formed in a prismatic shape. In addition, the protrusion 253 is not limited to the configuration that the protrusion 253 is installed to protrude from the back surface portion 251 of the BL chassis 25.

The optical sheet group 21 is formed by stacking a plurality of rectangular optical sheets 211, 211, . . . . The optical sheet group 21 is arranged to be closely attached on the back surface center portion of the display panel 11. The up-down and left-right directional lengths of the optical sheet group 21 are larger than the up-down and left-right directional lengths of the display area 111 of the display panel 11. The optical sheet group 21 covers the display area 111 of the display panel 11 from the back surface side. Each optical sheet 211 constituting the optical sheet group 21 has a light diffusing function, a light condensing function, or the like.

The light guide plate 22 is formed in a rectangular plate shape. The light guide plate 22 is made of, for example, an acrylic resin. The up-down and left-right directional lengths of the light guide plate 22 are larger than the up-down and left-right directional lengths of the display panel 11.

The light guide plate 22 allows the light entering to the inside of the light guide plate 22 to be emitted from the front surface (one surface) 221 of the light guide plate 22 (that is, surface emission). For this reason, a plurality of light-reflecting portions (not shown) is installed on the back surface 222 of the light guide plate 22. The light-reflecting portion is installed by performing silk printing, laser printing, shaping, or the like on the back surface 222. Light entering to the light-reflecting portion is reflected toward the front surface 221 side.

A plurality of rectangular notch-shaped recesses 225, 225, . . . are formed in the peripheral portion of the light guide plate 22. Two recesses 225, 225 are arranged in each of the upper and lower side portions of the light guide plate 22, and one recess 225 is arranged in each of the left and right side portions. In FIGS. 2 and 3, illustrated is the recess 225 which is arranged in the right side portion of the light guide plate 22. The number and up-down and left-right directional installation positions of the recesses 225, 225, . . . correspond to the number and up-down and left-right directional installation positions of the protrusions 253, 253, . . . of the BL chassis 25. In addition, the number and up-down and left-right directional installation positions of the recesses 225, 225, . . . are not limited to the number and up-down and left-right directional installation positions according to the embodiment.

The light entering to the inside of the light guide plate 22 is reflected on the front surface 221, back surface 222, or light-reflecting portion of the light guide plate 22 and, subsequently, passes through the front surface 221 to be emitted toward the outside of the light guide plate 22. In some cases, a part of the light entering to the inside of the light guide plate 22 passes through the back surface 222 (that is, light leakage occurs). In addition, in some cases, the rest part of the light entering to the inside of the light guide plate 22 enters to the inner surface of each recess 225, the intersection between the inner surfaces, the intersection between the inner surface of the recess 225 and the front surface 221, back surface 222, or end surface of the light guide plate 22 (for example, between the inner surface of the recess 225 and the right end surface 224 of the light guide plate 22 illustrated in FIGS. 2 and 3), or the like, so that unnecessary scattering may occurs.

If the light is scatted by the recess 225, in some cases, among the light emitted from the front surface 221 of the light guide plate 22, the amount of the light emitted from the vicinity of the recess 225 (for example, from the inner side than the broken line illustrated in FIG. 3) is larger than the amount of the light emitted from a portion other than the vicinity of the recess 225 (for example, from the outer side than the broken line illustrated in FIG. 3). As a result, in the front surface 221 of the light guide plate 22, the vicinity of the recess 225 becomes unnecessarily bright.

The light-reflecting sheet 23 is arranged to be closely attached on the back surface of the light guide plate 22 and completely covers the back surface of the light guide plate 22. Therefore, the light leaked from the back surface 222 of the light guide plate 22 is reflected on the light-reflecting sheet 23 and enters to the inside of the light guide plate 22 again.

The light-reflecting sheet 23 is formed in a rectangular shape.

The left-right directional length (hereinafter, referred to as a horizontal length) of the light-reflecting sheet 23 is larger than the horizontal length of the light guide plate 22 and is substantially equal to the horizontal length of the light source unit 24.

The up-down directional length (hereinafter, referred to as a vertical length) of the light-reflecting sheet 23 is equal to or larger than the vertical length of the light guide plate 22.

A plurality of rectangular notch-shaped recesses 231, 231, . . . are formed in the peripheral portion of the light-reflecting sheet 23. The number and up-down and left-right directional installation positions of the recesses 231, 231, . . . correspond to the number and up-down and left-right directional installation positions of the recesses 225, 225, . . . of the light guide plate 22.

The light guide plate 22 and the light-reflecting sheet 23 are interposed through an elastic member 142 between the front frame portion 131 of the P chassis 13 and the back surface portion 251 of the BL chassis 25.

One of the light source units 24 and 24 is arranged in each of the upper and lower portions the light guide plate 22. Each of the light source units 24 is supported through a heat sink (not shown) by the BL chassis 25.

The light source unit 24 is configured to include a plurality of LEDs 241, 241, . . . and an LED board 242.

The LED board 242 is formed in a horizontally-orientated rectangular shape which is elongated in the left-right direction.

The LEDs 241, 241, . . . provided with the upper (or lower) light source units 24 are installed at an equal interval in a row in the left-right direction on the lower (or upper) surface of the LED board 242. The LEDs 241, 241, . . . and the upper end surface (or the lower end surface 223) of the light guide plate 22 are arranged to be separated to face each other.

In addition, one of the light source units 24 and 24 may be configured to be arranged to face the left end surface of the light guide plate 22 and the other of the light source units 24 and 24 may be configured to be arranged to face the right end surface of the light guide plate 22. In addition, only the one side of the light source units 24 and 24 may be configured to be installed.

Next, the assembling of the display device 1 will be described.

The optical sheet group 21 is attached on the back surface of the display panel 11.

The display panel 11 attached with the optical sheet group 21 is attached to the bezel 12 so that the display area 111 is exposed from the portion surrounded by the front frame portion 121 of the bezel 12. At this time, the display panel 11 is attached to the bezel 12 so that the frame area 112 faces the front frame portion 121 of inner surface of the bezel 12 through the elastic member 141.

Next, the P chassis 13 is attached to the bezel 12. At this time, the outer surface of the front frame portion 131 of the P chassis 13 is in contact with the peripheral portion of the back surface of the optical sheet group 21. As a result, the display panel 11 attached with the optical sheet group 21 is interposed through the elastic member 141 between the front frame portion 121 of the bezel 12 and the front frame portion 131 of the P chassis 13.

Furthermore, the light-reflecting sheet 23 and the light guide plate 22 are attached to the inner surface of the back surface portion 251 of the BL chassis 25 in this order. At this time, the protrusion 253 is inserted into each recess 231 of the light-reflecting sheet 23 and each recess 225 of the light guide plate 22. As a result, the light-reflecting sheet 23 and the light guide plate 22 are position-aligned with respect to the BL chassis 25.

Furthermore, the light source units 24 and 24 are attached to the BL chassis 25 in such a manner that one of the light source units 24 and 24 is arranged to face the upper end surface of the light guide plate 22 and the other of the light source units 24 and 24 is arranged to face the lower end surface of the light guide plate 22.

Next, the BL chassis 25 holding the light guide plate 22, the light-reflecting sheet 23, the light source units 24 and 24 are attached through the elastic member 142 to the bezel 12 and the P chassis 13 interposing the display panel 11 and the optical sheet group 21. The elastic member 142 is arranged between the inner surface of the front frame portion 131 of the P chassis 13 and the peripheral portion of the front surface of the light guide plate 22.

As a result, the front frame portion 131 of the P chassis 13 is positioned at the front surface side of the recesses 225, 225, . . . . The frame area 112 of the display panel 11 is positioned at the front surface side of the front frame portion 131 of the P chassis 13.

The covers 26, 26, . . . cover peripheral portions of the recesses 225, 225, . . . and the recesses 225, 225, . . . from the front surface side of the light guide plate 22. At this time, the frame area 112 of the display panel 11 is positioned at the front surface side of the covering base end portions 262, 262, . . . of the covers 26, 26, . . . . However, the display area 111 of the display panel 11 is positioned at the front surface side of the covering protrusions 261, 261, . . . of the covers 26, 26, . . . . That is, at least a part of each cover 26 is arranged at the back surface side of the display area 111 of the display panel 11.

In the embodiment, the recesses 225, 225, . . . are covered by the front frame portion 131 of the P chassis 13. However, the peripheral portions (particularly, the plane-directional center side of the light guide plate 22 in the peripheral portions of the recesses 225, 225, . . . , for example, the left side of the peripheral portion of the recess 225 illustrated in FIGS. 2 and 3) of the recesses 225, 225, . . . cannot be sufficiently covered by the only front frame portion 131 (that is, only the covering base end portions 262, 262, . . . ). Therefore, the covering protrusion 261 is provided.

If the peripheral portions of the recesses 225, 225, . . . are sufficiently covered by only the front frame portion 131, the width of the front frame portion 131 needs to be increased so as to be large. For this reason, the front surface of the light guide plate 22 is covered so as to be unnecessarily wide. As a result, the illumination range of the backlight unit 2 is unnecessarily narrowed.

In other words, without unnecessarily increasing the width of the front frame portion 131, the covering protrusion 261 is installed so as to cover the necessary and sufficient positions on the front surface of the light guide plate 22.

Next, the illumination of the display panel 11 with the backlight unit 2 will be described.

The light emitted from the light source units 24 and 24 directly passes through the upper end surface and the lower end surface 223 of the light guide plate 22 to enter to the inside of the light guide plate 22 or passes through the upper end surface and the lower end surface 223 of the light guide plate 22 to enter to the inside of the light guide plate 22 by reflection on the light-reflecting sheet 23.

The light entering to the inside of the light guide plate 22 is emitted from the front surface 221 of the light guide plate 22. The light emitted from the light guide plate 22 is diffused and condensed by the optical sheet group 21 to pass through the back surface of the display panel 11 and enters to the inside of the display panel 11.

In this manner, the display panel 11 is illuminated from the back surface side by the backlight unit 2. The light entering to the inside of the display panel 11 passes through the display panel 11, or the passing through the display panel 11 is prevented. As a result, an image is displayed on the display area 111 of the display panel 11.

Due to the light scattering caused by the recess 225, in the front surface 221 of the light guide plate 22, the vicinity of the recess 225 is unnecessarily bright. However, the recess 225 and the peripheral portion of the recess 225 are covered by the cover 26.

Herein, first, a case where the P chassis 13 is black and the covers 26, 26, . . . are black is considered. In this case, the light scattered by the recesses 225, 225, . . . is blocked by the covers 26, 26, . . . . For this reason, excessively bright illumination of a part of the display panel 11 (specifically, in the display panel 11, a portion positioned at the front surface side of the recesses 225, 225, . . . of the light guide plate 22 and the portions of the peripheries of the recesses 225, 225, . . . ) with the light scattering caused by the recesses 225, 225, . . . is suppressed. In other words, the backlight unit 2 illuminates the display panel 11 with even brightness.

In this manner, since the black covers 26, 26, . . . have a light-shielding property, the brightness unevenness caused by the recesses 225, 225, . . . of the light guide plate 22 is efficiently suppressed.

Next, a case where the P chassis 13 is white and the covers 26, 26, . . . are white is considered. In this case, the light scattered by the recesses 225, 225, . . . is reflected at the light guide plate 22 side by the back surface of each of the covers 26, 26, . . . to enter to the inside of the light guide plate 22. For this reason, similarly to a case where the covers 26, 26, . . . are black, excessively bright illumination of a part of the display panel 11 with the light scattering caused by the recesses 225, 225, . . . is suppressed. In other words, the backlight unit 2 illuminates the display panel 11 with even brightness.

The white covers 26, 26, . . . have a total-reflection type light-reflecting property. For this reason, it is possible to suppress the problem in that, due to the light shielding of the covers 26, 26, . . . , the brightness at the vicinity of the recesses 225, 225, . . . of the light guide plate 22 is decreased, and thus, the brightness unevenness occurs. In other words, the white covers 26, 26, . . . can suppress the brightness unevenness caused by the covers themselves. Shortly speaking, since the white covers 26, 26, . . . reflect the light by the respective front surfaces of the covers 26, 26, . . . in comparison with the black covers 26, 26, . . . , it is possible to suppress the problem in that their own shadows of the covers 26, 26, . . . are projected onto the display area 111 of the display panel 11.

Next, a case where the P chassis 13 is gray and the covers 26, 26, . . . are gray is considered. Since the gray covers 26, 26, . . . have a partial-reflection type light-reflecting property, they have intermediate function and effect between a case where the covers 26, 26, . . . are black and a case where covers 26, 26, . . . are white. Therefore, when colors of the covers 26, 26, . . . are appropriately selected, the suppression of the brightness unevenness caused by the recesses 225, 225, . . . of the light guide plate 22 and the suppression of the brightness unevenness caused by the covers 26, 26, . . . themselves can be easily simultaneously achieved.

In the embodiment, the covering base end portions 262, 262, . . . that are parts of the covers 26, 26, . . . are also used as the front frame portion 131 of the P chassis 13. For this reason, by providing the covers 26, 26, . . . , unnecessary increase in size of the P chassis 13 is suppressed.

In addition, in the embodiment, the covers 26, 26, . . . are installed integrally with the P chassis 13. For this reason, a support unit supporting the covers 26, 26, . . . needs not to be separately arranged. Furthermore, by providing the covers according to the embodiment of the present invention, unnecessary increase in the number of components is suppressed.

However, the covers according to the embodiment of the present invention are not limited to the configuration that the covers are installed integrally with the P chassis 13. For example, if the display device 1 has a configuration that the P chassis 13 is not provided, the covers may be configured to be installed integrally with the bezel 12, the cabinet, or the like.

In addition, the covers according to the embodiment of the present invention may be separated from other members constituting the display device 1. In this case, as the covers, for example, sheet-shaped covers covering the recess 225 and the peripheral portion of the recess 225 by attaching on the front surface of the light guide plate 22 are considered.

In the display device 1 according to the embodiment, the P chassis 13 is arranged at the front surface sides of the protrusions 253, 253, . . . . For this reason, the protrusions 253, 253, . . . need not to be covered by erecting a part of the light-reflecting sheet 23 as disclosed in International Publication Pamphlet No. 2012/002074.

Second Embodiment

Figure 4:
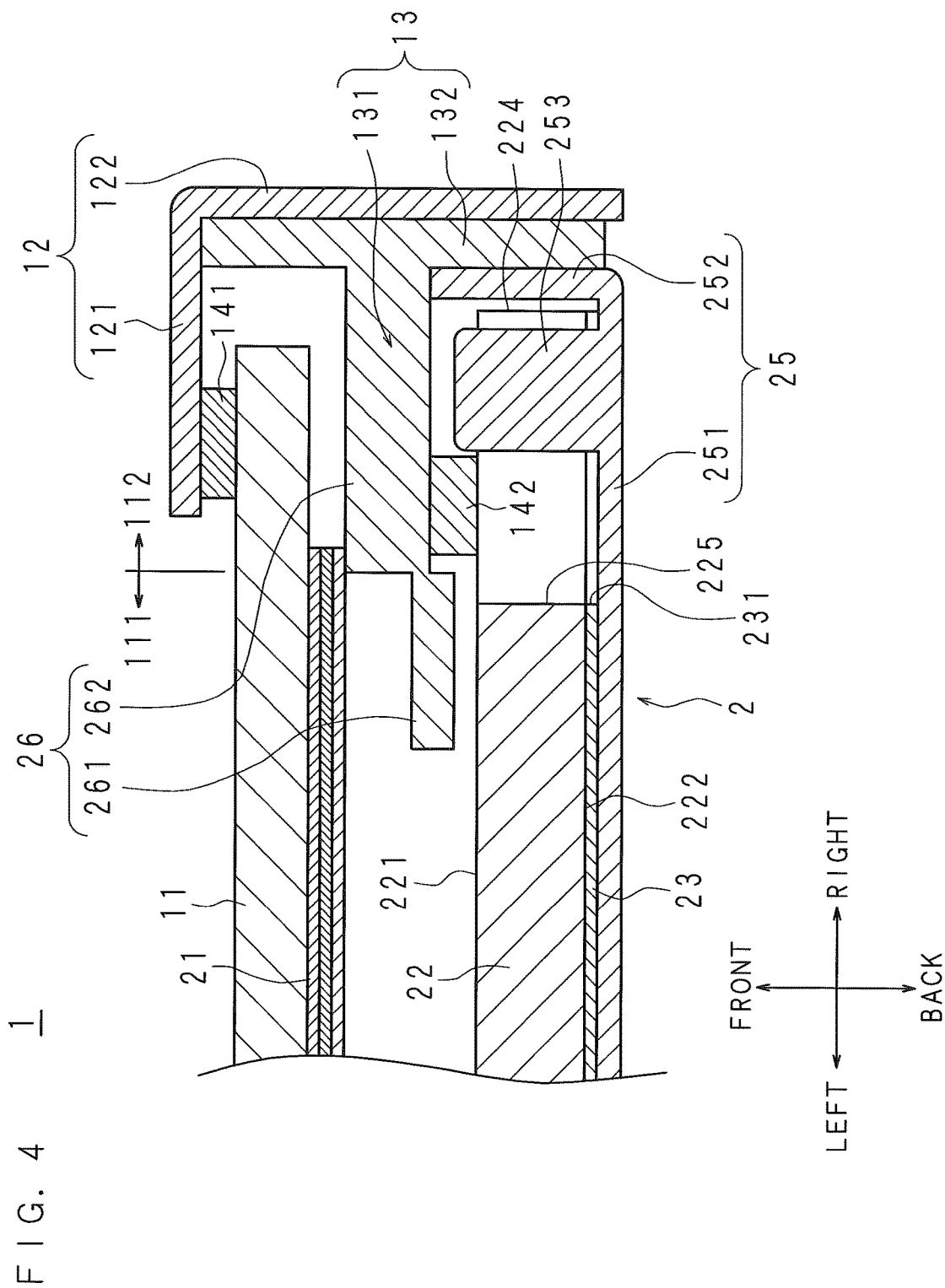
FIG. 4 is a horizontal cross-sectional diagram schematically illustrating a configuration of the vicinity of a cover included in a display device according to a second embodiment of the present invention.

FIG. 4 is a horizontal cross-sectional diagram schematically illustrating a configuration of the vicinity of a cover 26 included in a display device 1 according to a second embodiment of the present invention. FIG. 4 corresponds to FIG. 2 of the first embodiment.

The display device 1 according to the embodiment has substantially the same configuration as that of the display device 1 according to the first embodiment. Hereinafter, the difference from the first embodiment is described, and the components corresponding to those of the first embodiment are denoted by the same reference numerals and the description thereof is omitted.

The display device 1 according to the embodiment has a smaller sized frame than the display device 1 according to the first embodiment. For this reason, although the frame area 112 of the display panel 11 is positioned at the front surface side of the front frame portion 131 of the P chassis 13 like the case of the first embodiment, the display area 111 and the frame area 112 of the display panel 11 are positioned at the front surface side of each recess 225. That is, the entire recess 225 cannot be covered by only the front frame portion 131 of the P chassis 13.

However, in the embodiment, the recess 225 and the peripheral portion of the recess 225 are covered by both of the covering protrusions 261 and the covering base end portions 262 of the covers 26, 26, . . . . For this reason, excessively bright illumination of a part of the display panel 11 with the light scattering caused by the recess 225 is suppressed. That is, similarly to the display device 1 according to the first embodiment, the display device 1 according to the embodiment can also suppress the brightness unevenness.

Third Embodiment

Figure 5:
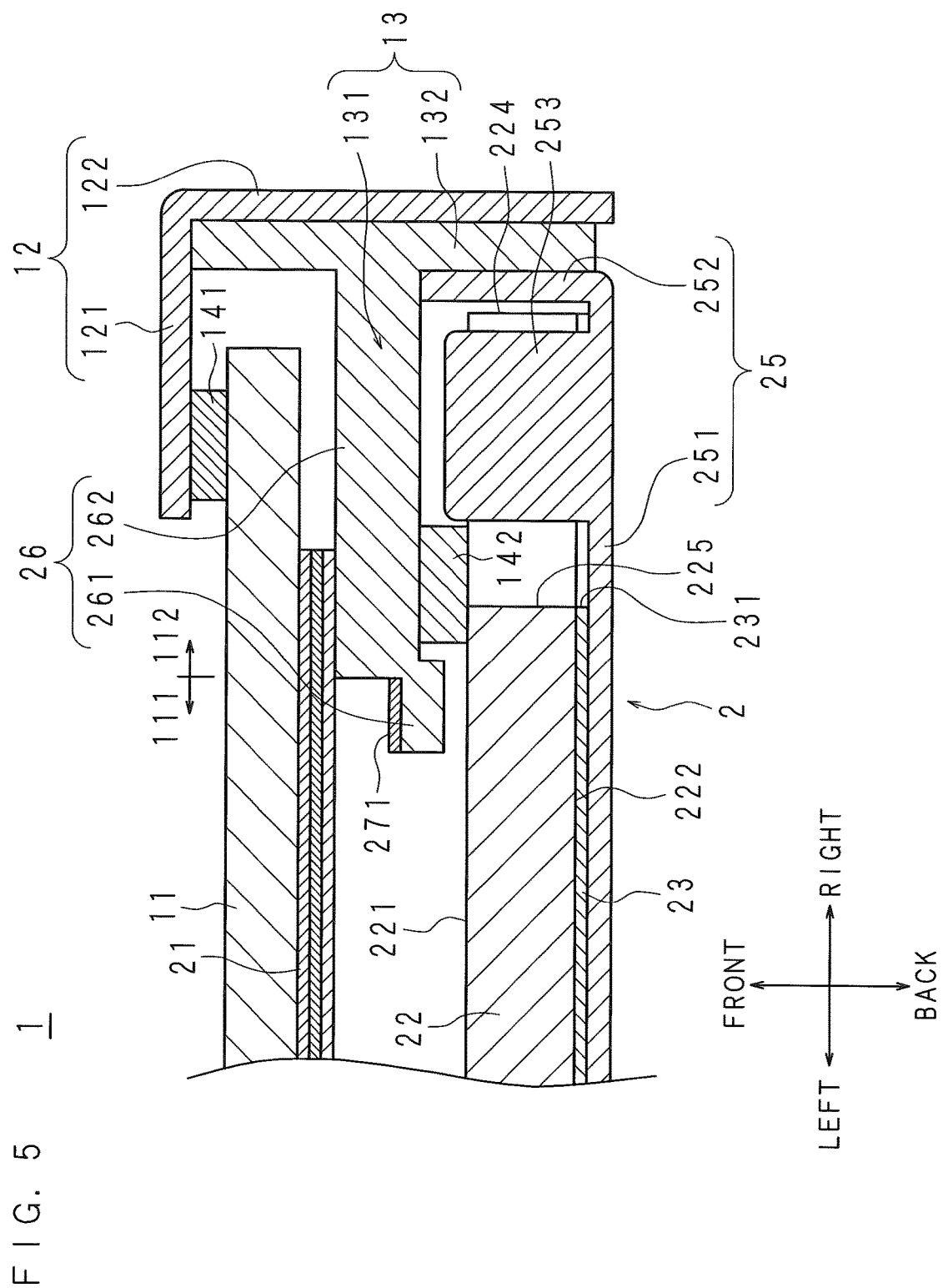
FIG. 5 is a horizontal cross-sectional diagram schematically illustrating a configuration of the vicinity of a cover included in a display device according to a third embodiment of the present invention.

FIG. 5 is a horizontal cross-sectional diagram schematically illustrating a configuration of the vicinity of a cover 26 included in a display device 1 according to a third embodiment of the present invention. FIG. 5 corresponds to FIG. 2 of the first embodiment.

The display device 1 according to the embodiment has substantially the same configuration as that of the display device 1 according to the first embodiment. Hereinafter, the difference from the first embodiment is described, and the components corresponding to those of the first embodiment are denoted by the same reference numerals and the description thereof is omitted.

A P chassis 13 according to the embodiment is black (or gray). In a case where P chassis 13 is black (or gray), each cover 26 is also black (or gray). In comparison with a case where the cover 26 is white, the black (or gray) cover 26 has a high light-shielding property.

The covering base end portion 262 of the cover 26 is positioned at the back surface side of the frame area 112 of the display panel 11. For this reason, the shadow of the covering base end portion 262 is not projected on the display area 111 of the display panel 11.

On the other hand, the covering protrusion 261 of the cover 26 is positioned at the back surface side of the display area 111 of the display panel 11. For this reason, when the covering protrusion 261 has a high light-shielding property, the shadow of the covering protrusion 261 is projected on the display area 111, so that there is a problem in that a part of the display area 111 is unnecessarily dark, and thus, the brightness unevenness occurs.

Therefore, a white light-reflecting sheet 271 is adhered to the front surface of the covering protrusion 261. That is, the light-reflecting sheet 271 functions as a light-reflecting portion arranged in the cover 26.

The back surface of each covering protrusion 261 is black or gray. Therefore, at least a part of the light scattered by the recesses 225, 225, . . . of the light guide plate 22 is blocked by the covering protrusions 261, 261, . . . . For this reason, excessively bright illumination of a part of the display panel 11 with the light scattering caused by the recesses 225, 225, . . . is suppressed. In other words, the backlight unit 2 illuminates the display panel 11 with even brightness.

The front surface side of each covering protrusion 261 can further enhance the light-reflecting property by the light-reflecting sheet 271 than by the covering protrusion 261 itself. Therefore, it is possible to suppress the problem in that their own shadows of the covering protrusions 261, 261, . . . are projected on the display area 111 of the display panel 11.

In addition, the light-reflecting portion according to the embodiment of the present invention is not limited to the light-reflecting sheet 271. For example, instead of the light-reflecting sheet 271, the covering protrusion 261 may be coated with a paint having a light-reflecting property.

In addition, in a case where the covering protrusion 261 is black, the light-reflecting sheet 271 may be gray. Furthermore, in a case where the covering protrusion 261 is dark gray, the light-reflecting sheet 271 may be bright gray.

Fourth Embodiment

Figure 6:
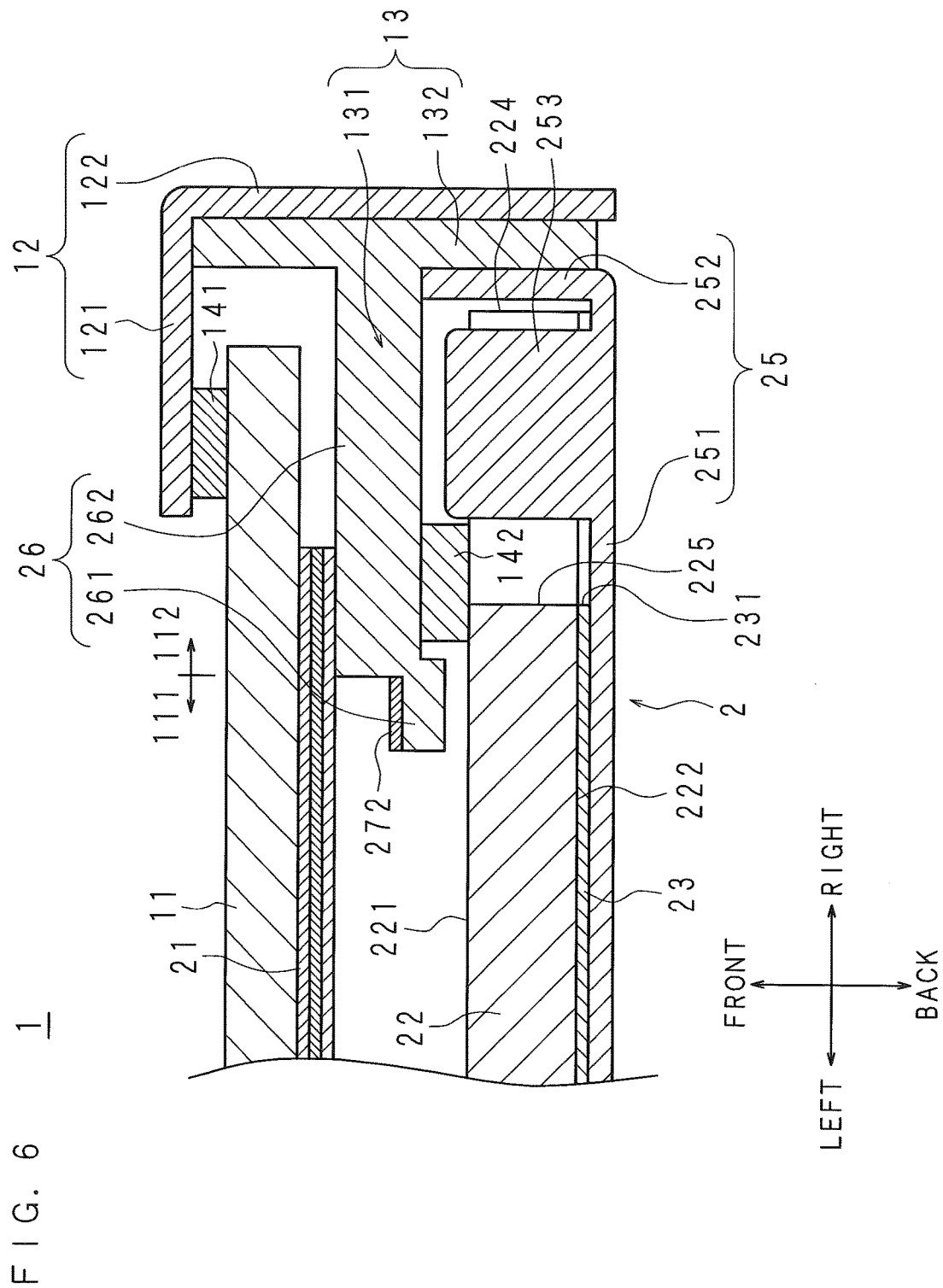
FIG. 6 is a horizontal cross-sectional diagram schematically illustrating a configuration of the vicinity of a cover included in a display device according to a fourth embodiment of the present invention.

FIG. 6 is a horizontal cross-sectional diagram schematically illustrating a configuration of the vicinity of a cover 26 included in a display device 1 according to a fourth embodiment of the present invention. FIG. 6 corresponds to FIG. 2 of the first embodiment.

The display device 1 according to the embodiment has substantially the same configuration as that of the display device 1 according to the first embodiment. Hereinafter, the difference from the first embodiment is described, and the components corresponding to those of the first embodiment are denoted by the same reference numerals and the description thereof is omitted.

A P chassis 13 according to the embodiment is white (or gray). In a case where the P chassis 13 is white (or gray), each cover 26 is also white (or gray). In comparison with a case where the cover 26 is black, the white (or gray) cover 26 has a high light-reflecting property.

The covering base end portion 262 of the cover 26 is positioned at the back surface side of the frame area 112 of the display panel 11. For this reason, the light reflected by the covering base end portion 262 does not enter to the display area 111 of the display panel 11.

On the other hand, the covering protrusion 261 of the cover 26 is positioned at the back surface side of the display area 111 of the display panel 11. For this reason, when the covering protrusion 261 has a high light-reflecting property, the light reflected by the covering base end portion 262 enters to the display area 111, so that there is a problem in that a part of the display area 111 is unnecessarily bright, and thus, the brightness unevenness occurs.

Therefore, a black light-shielding sheet 272 is adhered to the front surface of the covering protrusion 261. That is, the light-shielding sheet 272 functions as a light-shielding portion arranged in the cover 26.

The back surface of each covering protrusion 261 is white or gray. Therefore, at least a part of the light scattered by the recesses 225, 225, . . . of the light guide plate 22 is reflected by the covering protrusions 261, 261, . . . toward the light guide plate 22 side to enter to the inside of the light guide plate 22. For this reason, excessively bright illumination of a part of the display panel 11 with the light scattering caused by the recesses 225, 225, . . . is suppressed. In other words, the backlight unit 2 illuminates the display panel 11 with even brightness.

The front surface side of each covering protrusion 261 can further enhance the light-shielding property by the light-shielding sheet 272 than by the covering protrusion 261 itself. Therefore, it is possible to suppress the problem in that the light reflected by the covering protrusions 261, 261, . . . enters to the display area 111 of the display panel 11.

In addition, the light-shielding portion according to the embodiment of the present invention is not limited to the light-shielding sheet 272. For example, instead of the light-shielding sheet 272, the covering protrusion 261 may be coated with a paint having a light-shielding property.

Fifth Embodiment

Figure 7:
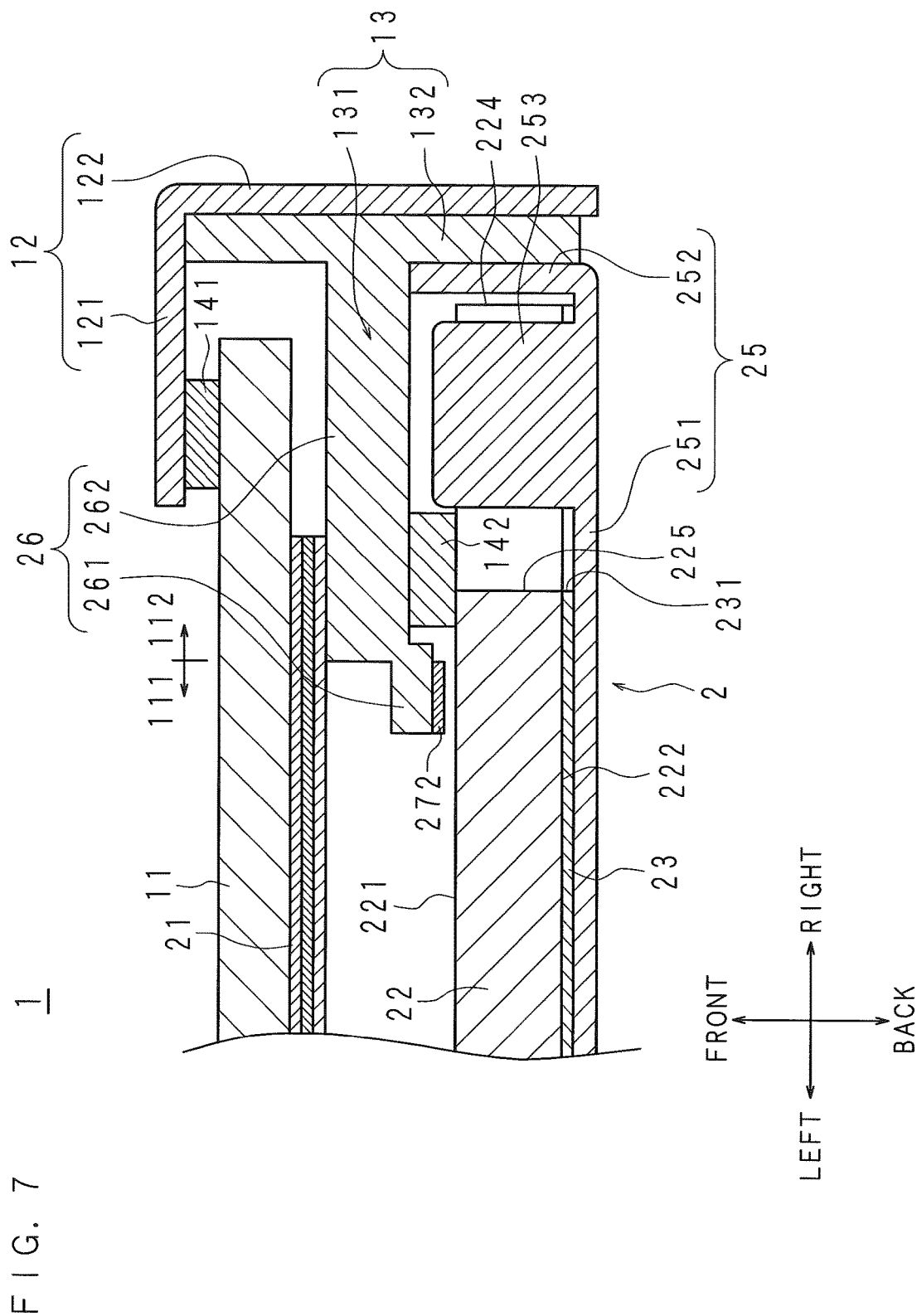
FIG. 7 is a horizontal cross-sectional diagram schematically illustrating a configuration of the vicinity of a cover included in a display device according to a fifth embodiment of the present invention.

FIG. 7 is a horizontal cross-sectional diagram schematically illustrating a configuration of the vicinity of a cover 26 included in a display device 1 according to a fifth embodiment of the present invention. FIG. 7 corresponds to FIG. 6 of the fourth embodiment.

The display device 1 according to the embodiment has substantially the same configuration as that of the display device 1 according to the fourth embodiment. Hereinafter, the difference from the fourth embodiment is described, and the components corresponding to those of the fourth embodiment are denoted by the same reference numerals and the description thereof is omitted.

In the embodiment, a black light-shielding sheet 272 is adhered to the back surface of the covering protrusion 261.

The front surface of each covering protrusion 261 is white or gray with a high light-reflecting property. Therefore, it is possible to suppress the problem in that their own shadows of the covering protrusions 261, 261, . . . are projected on the display area 111 of the display panel 11.

The back surface side of each covering protrusion 261 can further enhance the light-shielding property by the light-shielding sheet 272 than by the covering protrusion 261 itself. Therefore, the light scattered by the recesses 225, 225, . . . of the light guide plate 22 is blocked by the light-shielding sheets 272, 272, . . . . For this reason, excessively bright illumination of a part of the display panel 11 with the light scattering caused by the recesses 225, 225, . . . is suppressed. In other words, the backlight unit 2 illuminates the display panel 11 with even brightness.

If the light-shielding sheet 272 does not exist, there is a problem in that, due to the light-reflecting property of the back surface of the covering protrusion 261, the light scattering in the vicinity of the recess 225 is aggravated.

As can be understood from the third to fifth embodiments, in a case where the cover 26 itself cause the brightness unevenness, it is preferable that a portion of the cover 26 causing the brightness unevenness be covered by the light-reflecting sheet 271 or the light-shielding sheet 272.

Sixth Embodiment

Figure 8:
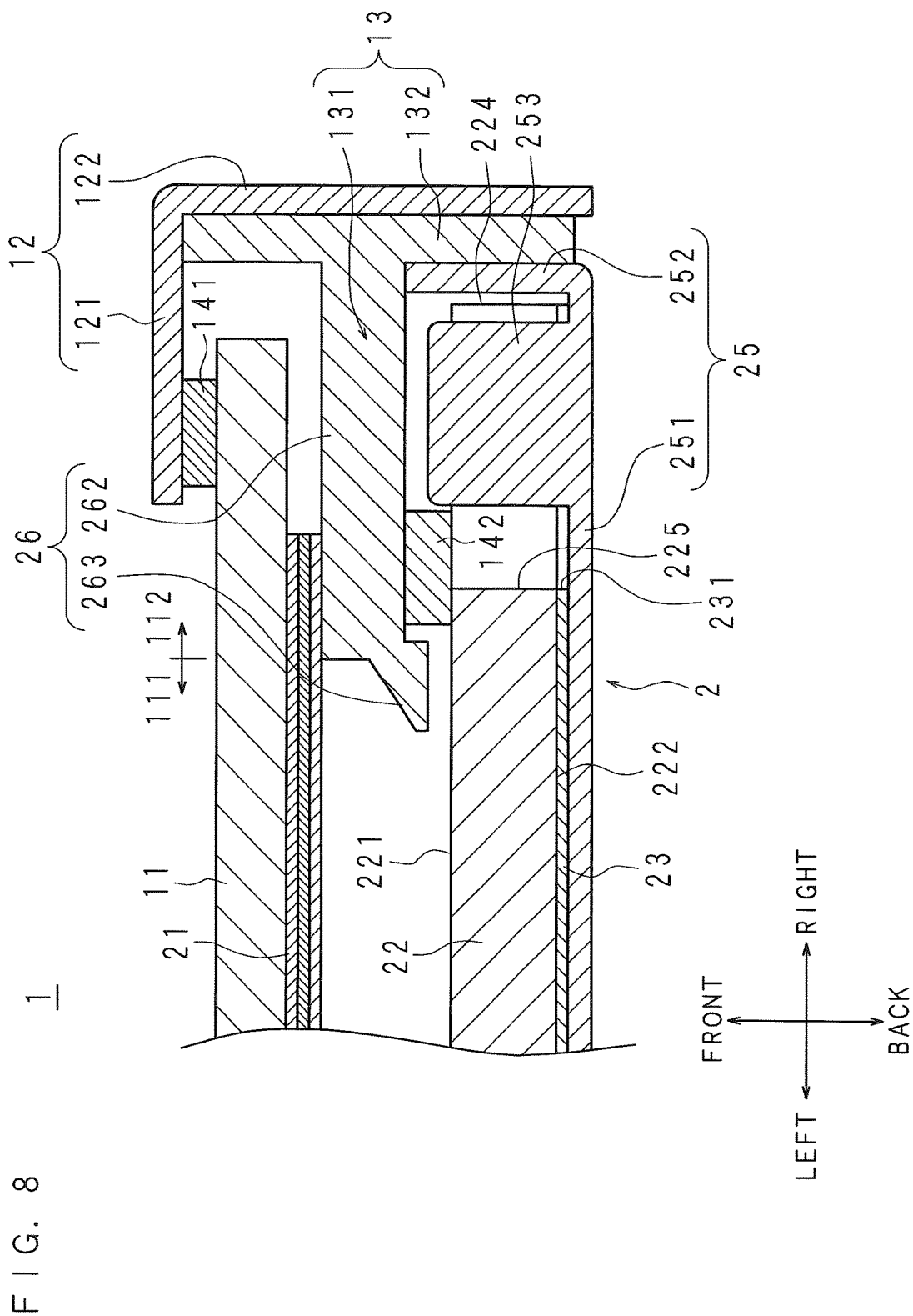
FIG. 8 is a horizontal cross-sectional diagram schematically illustrating a configuration of the vicinity of a cover included in a display device according to a sixth embodiment of the present invention.

FIG. 8 is a horizontal cross-sectional diagram schematically illustrating a configuration of the vicinity of a cover 26 included in a display device 1 according to a sixth embodiment of the present invention. FIG. 8 corresponds to FIG. 2 of the first embodiment.

The display device 1 according to the embodiment has substantially the same configuration as that of the display device 1 according to the first embodiment. Hereinafter, the difference from the first embodiment is described, and the components corresponding to those of the first embodiment are denoted by the same reference numerals and the description thereof is omitted.

Each cover 26 according to the first embodiment has the tongue-shaped covering protrusion 261 having a constant thickness. Each cover 26 according to the embodiment has a covering protrusion 263.

The covering protrusion 263 is formed in a tapered tongue shape of which thickness is gradually decreased from the base end side (covering base end portion 262 side) toward the distal end side. That is, with respect to the covering protrusion 263, the plane-directional center side (the left side in FIG. 8) of the light guide plate 22 is thinner than the peripheral edge side (the right side in FIG. 8) of the light guide plate 22. In this case, the back surface of the covering protrusion 263 is parallel to the front surface of the light guide plate 22, but the front surface of the covering protrusion 263 is slanted with respect to the front surface of the light guide plate 22.

In the display panel 11, the display area 111 side is bright, and the frame area 112 side is dark. The covering protrusion 263 alleviates a rapid change of the brightness between the display area 111 side and the frame area 112 side in the vicinity of the covering protrusion 263. Therefore, the covering protrusion 263 is not easily noticeable.

Since the back surface of the covering protrusion 263 is parallel to the front surface of the light guide plate 22, particularly, in a case where the back surface side of the covering protrusion 263 has a light-reflecting property, the light entering to the back surface side of the covering protrusion 263 can be securely reflected toward the light guide plate 22 side.

The front surface of the covering protrusion 263 is slanted with respect to the front surface of the light guide plate 22. For this reason, in comparison with the case where the front surface of the covering protrusion is parallel to the front surface of the light guide plate 22, the front surface of the covering protrusion 263 is directed to the wide range of the display panel 11. Therefore, particularly, in a case where the front surface side of the covering protrusion 263 has a light-reflecting property, the light entering to the front surface side of the covering protrusion 263 can be reflected toward the wide range of the display panel 11. Therefore, in comparison with a case where the light entering to the front surface side of the covering protrusion 263 is reflected toward the narrow range of the display panel 11, it is possible to suppress the occurrence of the brightness unevenness that a part of the display panel 11 is partially bright.

Seventh Embodiment

Figure 9:
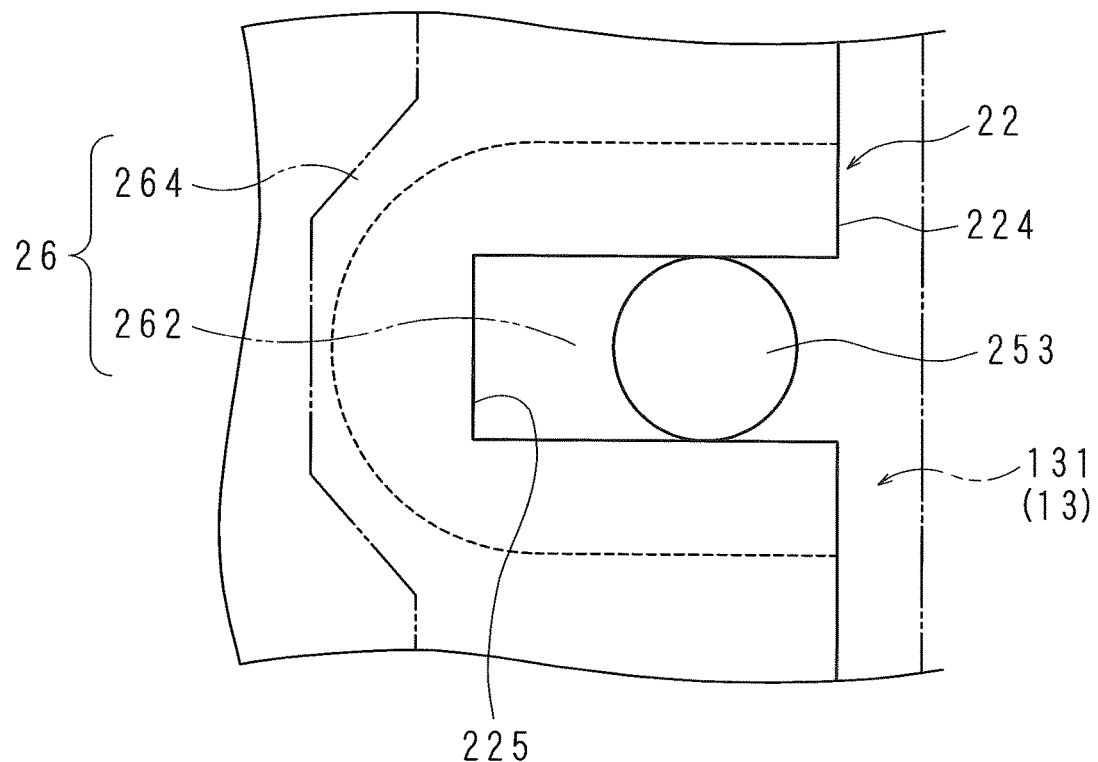
FIG. 9 is a front diagram schematically illustrating a configuration of the vicinity of a cover included in a display device according to a seventh embodiment of the present invention.
Figure 9:
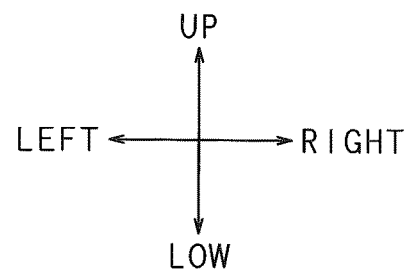

FIG. 9 is a front diagram schematically illustrating a configuration of the vicinity of a cover 26 included in a display device 1 according to a seventh embodiment of the present invention. FIG. 9 corresponds to FIG. 3 of the first embodiment.

The display device 1 according to the embodiment has substantially the same configuration as that of the display device 1 according to the first embodiment. Hereinafter, the difference from the first embodiment is described, and the components corresponding to those of the first embodiment are denoted by the same reference numerals and the description thereof is omitted.

Each cover 26 according to the embodiment has the covering protrusion 264 instead of the rectangular covering protrusion 261 according to the first embodiment.

The covering protrusion 264 is formed in a tapered trapezoidal shape, and a length (vertical length in FIG. 9) of the covering protrusion 264 in a peripheral edge direction of the light guide plate 22 at the plane-directional center side (the left side in FIG. 9) of the light guide plate 22 is smaller than that at the peripheral edge side (the right side in FIG. 9) of the light guide plate 22.

In the display panel 11, the display area 111 side is bright, and the frame area 112 side is dark. Since the outer edge portion of the covering protrusion 264 is in a slanted shape, a rapid change of the brightness between the display area 111 side and the frame area 112 side in the vicinity of the covering protrusion 264 is alleviated. Therefore, the covering protrusion 264 is not easily noticeable.

Eighth Embodiment

Figure 10:
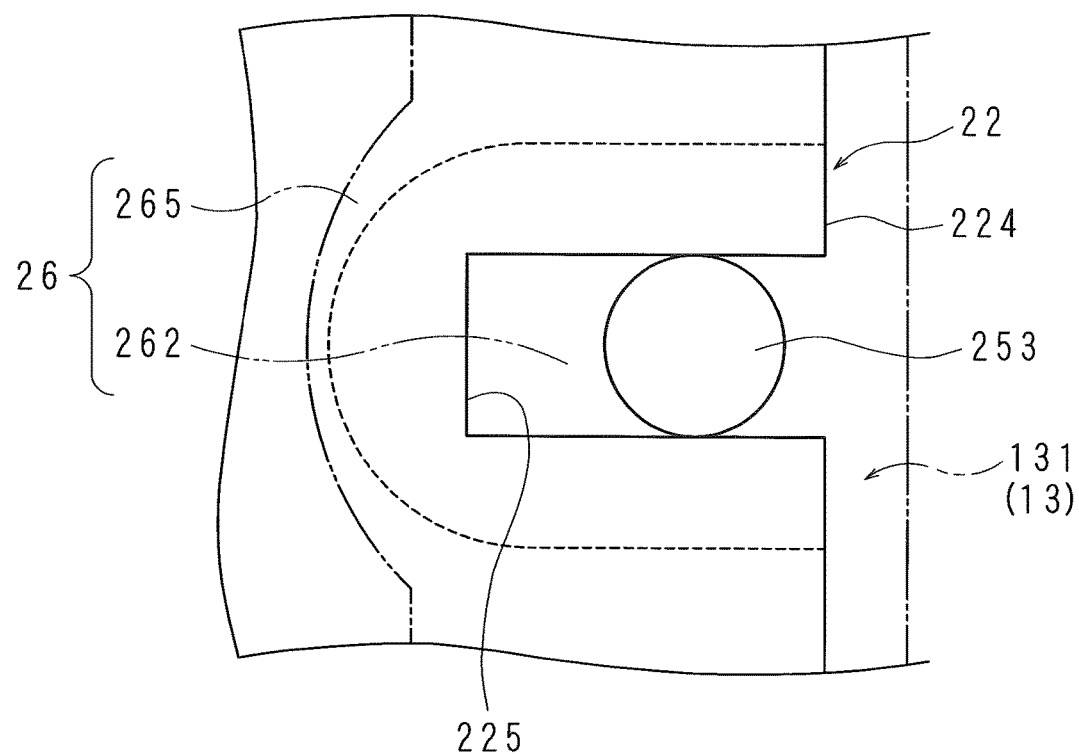
FIG. 10 is a front diagram schematically illustrating a configuration of the vicinity of a cover included in a display device according to an eighth embodiment of the present invention.
Figure 10:
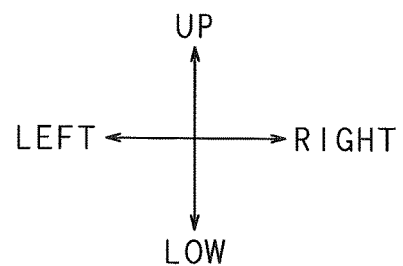

FIG. 10 is a front diagram schematically illustrating a configuration of the vicinity of a cover 26 included in a display device 1 according to an eighth embodiment of the present invention. FIG. 10 corresponds to FIG. 9 of the seventh embodiment.

The display device 1 according to the embodiment has substantially the same configuration as that of the display device 1 according to the seventh embodiment. Hereinafter, the difference from the seventh embodiment is described, and the components corresponding to those of the seventh embodiment are denoted by the same reference numerals and the description thereof is omitted.

Each cover 26 according to the embodiment has the covering protrusion 265 instead of the rectangular covering protrusion 264 according to the first embodiment.

The covering protrusion 265 is formed in a comb shape (that is, a smooth tapered shape), and a length (vertical length in FIG. 10) of the covering protrusion 265 in a peripheral edge direction of the light guide plate 22 at the plane-directional center side (the left side in FIG. 10) of the light guide plate 22 is smaller than that at the peripheral edge side (the right side in FIG. 10) of the light guide plate 22.

In the display panel 11, the display area 111 side is bright, and the frame area 112 side is dark. Since the outer edge portion of the covering protrusion 265 is in an arc shape, a rapid change of the brightness between the display area 111 side and the frame area 112 side in the vicinity of the covering protrusion 265 is alleviated. Therefore, the covering protrusion 265 is not easily noticeable.

The illumination device according to the embodiment of the present invention is not limited to the backlight unit 2 which is assembled into the display device 1. For example, the illumination device may be configured as a backlight unit of a display unit included in a mobile phone, a mobile information terminal, or the like. Alternatively, the illumination device may be configured as a ceiling light, a wall-mounted illumination fixture, or the like. In a case where the illumination device is configured as a ceiling light, for example, the front surface of the light guide plate may be directed downward to be arranged in the horizontal orientation.

The embodiments disclosed herein are exemplary ones in all points, and it should be noted that the embodiments are construed not to be restrictive ones. It should be noted that the scope of the invention is not limited to the above-described ones, but equivalents to the claims and all available changes in the claims intend to be included.

In addition, if the effects of the invention can be obtained, components which are not disclosed in the first to eighth embodiments may be included in the display device 1 or the backlight unit 2.

The configurational components (technical features) disclosed in the embodiments may be combined, and new technical features may be formed by the combination.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A display device comprising:
    an illumination device which comprises a light guide plate having a notch-shaped recess in a peripheral portion and emitting entering light from one surface and a light guide plate support unit being provided with a protrusion to be engaged with the recess to position the light guide plate and supporting the light guide plate;
    a display panel which includes a display area and a frame area surrounding the display area, the display area being illuminated from a back surface side by the illumination device;
    a panel support unit with a frame-shape which is arranged between the display panel and the illumination device, supports the display panel, and covers a portion of the light guide plate corresponding to the frame area from a side of the one surface; and a covering protrusion protruding inward from an inner peripheral edge of a portion in the panel support unit, the portion covering the recess, wherein the covering protrusion is arranged at a back surface side of the display area.

2. The display device according to claim 1, wherein the panel support unit has a light-shielding property.

3. The display device according to claim 2, further comprising
a light-reflecting portion arranged in the covering protrusion.

4. The display device according to claim 3, wherein the light-reflecting portion is arranged on a surface of the covering protrusion facing the display panel.

5. The display device according to claim 1, wherein the panel support unit has a light-reflecting property.

6. The display device according to claim 5, further comprising
a light-shielding portion arranged in the covering protrusion.

7. The display device according to claim 6, wherein the light-shielding portion is arranged on a surface of the covering protrusion facing the display panel or on a surface of the covering protrusion facing the one surface.

8. The display device according to claim 1, wherein the covering protrusion is provided integrally with the panel support unit.

9. The display device according to claim 1, wherein a thickness of the covering protrusion becomes thinner as the covering protrusion approaches to a plane-directional center side of the light guide plate, or a length of the covering protrusion along an inner peripheral edge of the panel support unit becomes shorter toward a distal end side of the covering protrusion.

10. The display device according to claim 1, wherein a thickness of the covering protrusion in a direction orthogonal to the one surface is thinner than a thickness of the panel support unit in the direction, and
the covering protrusion is arranged close to the light guide plate at the inner peripheral edge of the panel support unit in such a manner that a distance between a bottom surface of the covering protrusion facing the one surface and the one surface is shorter than a distance between a bottom surface of the panel support unit facing the one surface and the one surface.

11. The display device according to claim 1, wherein the covering protrusion is present only in the vicinity of the recess.

* * * * *